June 12, 1962  M. A. FAGET ET AL  3,038,175
SURVIVAL COUCH
Filed Sept. 18, 1959  2 Sheets-Sheet 1

INVENTORS
MAXIME A. FAGET
WILLIAM M. BLAND, JR.
JACK C. HEBERLIG

BY

ATTORNEYS

June 12, 1962   M. A. FAGET ET AL   3,038,175
SURVIVAL COUCH

Filed Sept. 18, 1959   2 Sheets-Sheet 2

INVENTORS
MAXIME A. FAGET
WILLIAM M. BLAND, JR.
JACK C. HEBERLIG

BY
ATTORNEYS

United States Patent Office 3,038,175
Patented June 12, 1962

3,038,175
SURVIVAL COUCH
Maxime A. Faget, Newport News, and William M. Bland, Jr., and Jack C. Heberlig, Hampton, Va., assignors to the United States of America as represented by the Administrator of National Aeronautics and Space Administration
Filed Sept. 18, 1959, Ser. No. 840,983
4 Claims. (Cl. 5—345)
(Granted under Title 35, U.S. Code (1952), sec. 266)

The invention described herein may be manufactured and used by or for the Government of the United States of America for governmental purposes without the payment of any royalties thereon or therefor.

This invention relates generally to a couch, and more particularly to a couch for supporting a living occupant being subjected to large acceleration or deceleration forces.

It has been proposed heretofore to support a human body during airflight by various seating arrangements. One such prior art seating arrangement utilizes a padded or cushioned chair such as, for example, an airline passenger seat. The chair also may be unpadded as, for example, a bucket type seat often used in military aircraft. Another type of prior art seating arrangement includes a sling having a metal or web chair-like framework which may be covered by a resilient netting, web or strap material. The resilient netting, webs or straps, or any combination thereof, may be made from any suitable material such as, for example, nylon, cotton, dacron, rayon and the like. These prior art seating arrangements provide posterior support as well as comfort for persons reclining thereon, and have generally proven quite satisfactory for supporting aviators and passengers during flight in airplanes. However, these prior art seating arrangements provide little or no side or lateral support for the occupant. Consequently, when a large accelerative or decelerative "G" force having a magnitude of about 3 or 4 is experienced by an aircraft occupant, as may occur in a power dive, pull out or a fast turn, the occupant tends to black out and becomes unconscious due to blood being drawn from the appendages. A shearing of the occupant's vertebrae may also occur if the occupant is subjected to oscillations and buffeting at high "G" forces.

Accordingly, it is an object of this invention to provide a new and improved couch.

Another object of the present invention is to provide a lightweight and rigid contour couch.

A further object of the present invention is to provide a contour couch providing both lateral and posterior support for an occupant thereof.

A still further object of the invention is to provide a full body support for evenly distributing acceleration and deceleration forces over the body of an occupant.

Another object of the present invention is to provide a couch having protective and operational accessories located thereon.

Still another object of the present invention is to provide a couch for support of an occupant over a substantial portion of the occupant's body and more efficient distribution of accelerative or decelerative "G" loads on the body of the occupant.

The foregoing as well as other objects are accomplished in accordance with this invention by the provision of a rigid and lightweight couch contoured to the shape of the occupant in a manner to provide both lateral and posterior support for the full length of the occupant.

A more complete understanding of the invention and many of the attendant advantages thereof will be readily appreciated as the same becomes better understood by reference to the following detailed description when considered in connection with the accompanying drawings wherein.

Figure 1:
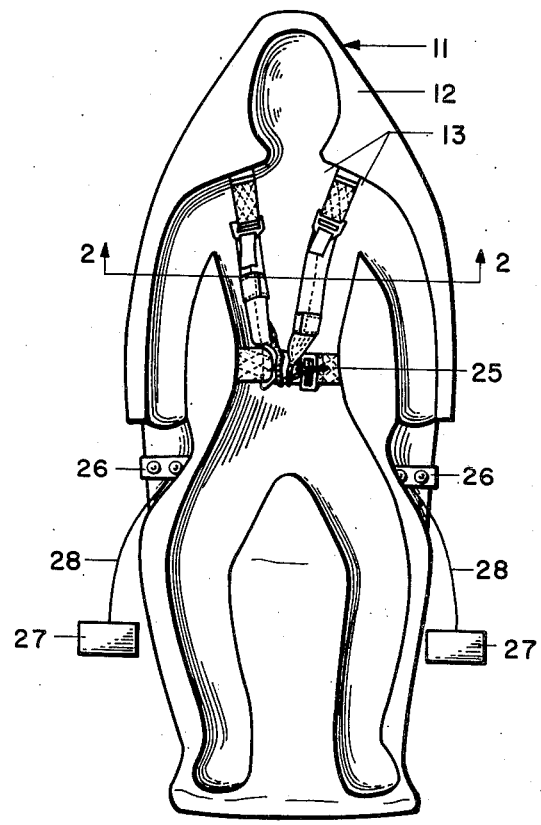
FIG. 1 is a plan view of the supporting couch in accordance with the invention.
Figure 2:
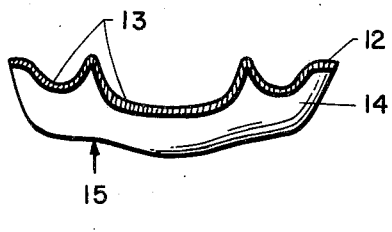
FIG. 2 is a sectional view of the couch of FIG. 1 taken on the line 2—2.

Referring now to the drawings wherein like reference numerals designate identical or corresponding parts throughout the several views, and more particularly to FIG. 1 whereon the contour lounge, generally indicated by the reference numeral 11, is shown as consisting of a sheet 12 of lightweight and rigid material having grooves or indented surfaces 13 formed therein which correspond to the shape of the body to be subjected to the high "G" forces. The sheet 12 is made of material which can be subjected to forces of several "G's" in magnitude without deformation and fracture. A preferred material is Fiberglas. The Fiberglas may be molded or shaped by any conventional method of working with this material. As more clearly shown in FIG. 2, the side walls of the grooves are made to extend high enough to give the occupant's torso and appendages both lateral as well as posterior support. A posterior layer 14 of shock absorbent materials such as, for example, honeycomb rigid plastics and honeycomb metals, such as aluminum honeycomb, may also be applied to sheet 12 to absorb shock forces which may be applied to the posterior side of the couch. Generally, the honeycomb material absorbs shock forces by a process whereby the shock forces crush the cell structure of the honeycomb material. A preferred honeycomb rigid shock absorbent material is honeycombed Fiberglas.

Figure 3:
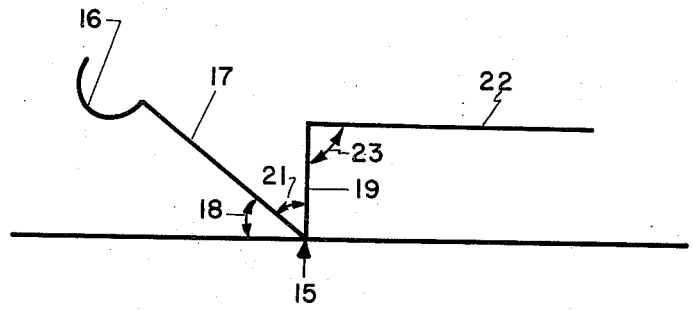
FIG. 3 is a side view illustrating the preferred angles used in supporting a human occupant by the couch of FIG. 1.

FIG. 3 of the drawings illustrates the preferred levels at which different anatomical regions of a human occupant are supported when the major "G" forces are to be applied in the direction indicated by the arrowhead 15. The use of the preferred angles provides comfort to the occupant and also insures the maintenance of a good supply of blood in the heart region so that the brain can be adequately supplied with blood. Consequently, the occupant does not black out when subjected to high "G" forces as, for example, during critical "G" periods of space travel such as may occur at launching, reentry into the earth's atmosphere from outer space, and upon landing on the earth's surface. As shown in FIG. 3, the preferred angles are formed by the head support portion 16 of the lounge 11 positioned so that the back support 17 is elevated forming an angle 18 in the range of 0 degrees to 20 degrees from the horizontal. The lower body regions are supported by thigh support 19 which is elevated forming an angle 21. Angle 21 when added together with angle 18 preferably forms an angle of about 90 degrees. The lower leg appendages and feet of the occupant are supported by leg support 22. The structure causes the knees of the occupant to bend preferably forming an angle 23 of about 90 degrees between the thigh portions of the body and the lower legs.

Figure 4:
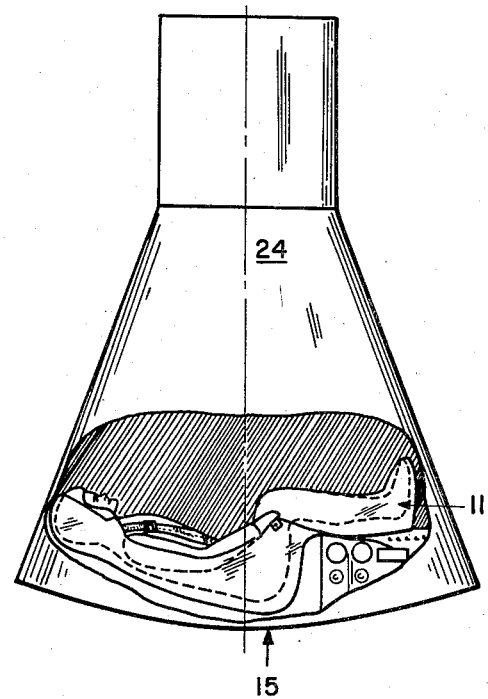
FIG. 4 illustrates an application of a contour couch having the angle configuration of FIG. 3 positioned in a space vehicle.

FIG. 4 more vividly illustrates one present day application of the contour couch in a space capsule 24 wherein the high "G" forces sustained by the occupant will be in the direction indicated by arrowhead 15. Arrowhead 15 indicates the direction of the "G" forces resulting from acceleration and deceleration forces caused by launching the space vehicle from the earth, reentry from outer space of the vehicle into the earth's atmosphere, and impact upon landing on the earth's surface.

If desired, complete immobilization of the occupant may be obtained by providing a restraining means or harness 25, as shown in FIG. 1, whereby the occupant is firmly positioned within the contour lounge. The harness 25 may be affixed to the sheet 12 after molding or during the molding operation. Any suitable harness system may be used in the present invention such as, for example, the strap systems currently used in aircraft for retaining crew members and passengers in their seats. Mesh blankets and tunics may also be utilized. Any strong material which is resilient and stretches sufficiently to absorb shock loads, yet is capable of recovering slowly its original shape, may be used in the harness system. The material should also preferably be soft and pliable. It will be appreciated by those skilled in the art that a body immobilized in this manner may continue to operate fingertip controls 26 provided in the support couch, while subjected to omnidirectional high "G" forces. The controls 26 are connected with a control box 27 by a wiring means 28 and are capable of performing certain operations such as, for example, guidance.

The contour lounge may be used to support a body which is to be subjected to perpendicular, lateral or horizontal forces having a magnitude of from about 3 "G" to about 25 "G" of force. The acceleration or deceleration forces are absorbed over a large area of the occupant's body and it has been found that the human body is better adapted to absorb large "G" forces when supported in this manner.

The harness of the contour couch may also be provided with a quick release mechanism for releasing the occupant from the strap system thereby allowing the occupant to leave the couch after landing on the earth's surface in a space vehicle.

Obviously numerous modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. A couch comprising a sheet of lightweight, rigid material having individualized recesses formed therein conforming to the lateral and posterior contour of a specific preselected living occupant, and a posterior layer of crushable cellular honeycomb shock absorbing material applied to said sheet, said occupant, when positioned in said couch recesses, being substantially protected thereby from physical injury during application through said couch of omnidirectional high accelerative G forces upon said occupant.

2. A couch according to claim 1 wherein the lightweight, rigid material is Fiberglas.

3. A couch according to claim 2 and having means for retaining the occupant in said couch.

4. A couch according to claim 3 and having fingertip control means capable of being operated by said occupant.

References Cited in the file of this patent

UNITED STATES PATENTS

| | | |
|---|---|---|
| 2,547,419 | Sugarman et al. | Apr. 3, 1951 |
| 2,625,683 | Roth et al. | Jan. 20, 1953 |
| 2,751,268 | Creelman | June 19, 1956 |
| 2,808,875 | Bargen | Oct. 8, 1957 |
| 2,823,393 | Baldine | Feb. 18, 1958 |
| 2,854,230 | Jones et al. | Sept. 30, 1958 |
| 2,913,738 | Wise | Nov. 24, 1959 |
| 2,998,214 | Peterman | Aug. 29, 1961 |

FOREIGN PATENTS

| | | |
|---|---|---|
| 268 | Great Britain | Jan. 6, 1892 |